INVENTORS
ARTHUR L. LEE
ARTHUR B. COVAL

Feb. 1, 1966         A. L. LEE ETAL         3,232,125
              CONSTANT MESH TRANSMISSION
Filed Aug. 30, 1962                    4 Sheets-Sheet 3

INVENTORS
ARTHUR L. LEE
ARTHUR B. COVAL
BY
Stanley J Price
THEIR ATTORNEY

United States Patent Office 3,232,125
Patented Feb. 1, 1966

3,232,125
CONSTANT MESH TRANSMISSION
Arthur L. Lee and Arthur B. Coval, Columbus, Ohio, assignors to Consolidation Coal Company, Pittsburgh, Pa., a corporation of Pennsylvania
Filed Aug. 30, 1962, Ser. No. 220,428
4 Claims. (Cl. 74—15.86)

This invention relates to a constant mesh transmission and more particularly to a constant mesh transmission having a plurality of output shafts.

This invention is an improvement of the constant mesh transmission disclosed in our copending application Serial No. 54,253, now Patent No. 3,064,488, filed September 6, 1960 and entitled "Constant Mesh Transmission."

The transmission shown and described in the above application discloses a single output shaft. This arrangement has proved very satisfactory in conventional haulage type vehicles where the transmission is employed solely to connect the prime mover located at the front of the vehicle to rear propelling wheels. The superior performance of the above transmission also makes it suitable for vehicles having nonconventional arrangements of the prime mover and the propelling wheels and also vehicles that require auxiliary power take-off devices to drive accessories on the vehicle.

It is desirable in vehicles such as jet aircraft refuelers to have the prime mover perform, in addition to propelling the vehicle, other functions previously performed by separate prime movers. For example, in a jet aircraft refueler the large diameter hoses must be reeled in. This requires a source of power. The pumps that convey jet fuel from the refueler to the aircraft must be driven by a source of power. Because of the large volumes of fuel that must be transferred and the short period of time allotted for refueling, the source of power for driving the pump must be substantial. We have, by our invention, provided a constant mesh transmission that retains the features discussed in our copending application Serial No. 54,253 and, in addition, provide a plurality of output shafts and an auxiliary power take-off device that has a plurality of speeds controlled by the transmission range clutches. By our improvements, our transmission is now suitable for use with vehicles other than conventional vehicles. In particular, our transmission can now be used with vehicles such as a jet refueler.

Our improved transmission now provides an output shaft that may be connected to the refuler pump to provide engine horsepower for driving the pump. Other output shafts are provided so that the transmission may be supported by the vehicle frame in any suitable position and drive propelling wheels located either in front of or to the rear of the transmission. The other output shafts can also drive propelling wheels located both in front of and to the rear of the transmission. This arrangement of the plurality of output shafts simplifies the design of certain vehicles in that there is greater latitude in selecting the position of the prime mover and transmission on the vehicle frame and the sets of wheels that will serve as the propelling wheels.

There are also vehicles other than refuelers that require an auxiliary source of power to drive accessories at a plurality of speeds both when the vehicle is moving and when it is stationary. In the past it has been the practice to provide a multispeed auxiliary gear box with the power take-off device. Our improved transmission, as hereinafter disclosed, eliminates the extra multispeed gear box and we can now connect a conventional single speed power take-off device to our transmission and obtain a plurality of speeds.

Briefly, our invention includes an auxiliary power take-off device that has gearing meshing with one of the connecting gears in the connecting section of the transmission housing. The speed of the power take-off device is controlled by the range clutches in the transmission so that the speed of the power take-off device can be changed by shifting the transmission from one range to another. We have also provided an auxiliary output shaft that has a forwardly extending output connection and a rearwardly extending output connection.

Accordingly, the principal object of this invention is to provide an improved constant mesh transmission that has a plurality of output shafts.

Another object of this invention is to provide a transmission having a conventional single speed power take-off device connected to our transmission in a manner that the power take-off device has a plurality of speeds.

Another object of this invention is to provide a constant mesh transmission wherein the range clutches control the speed of a power take-off device.

These and other objects and advantages of this invention will be more completely described and distinctly pointed out in the following specification, the accompanying drawings and the appended claims.

Figure 1:
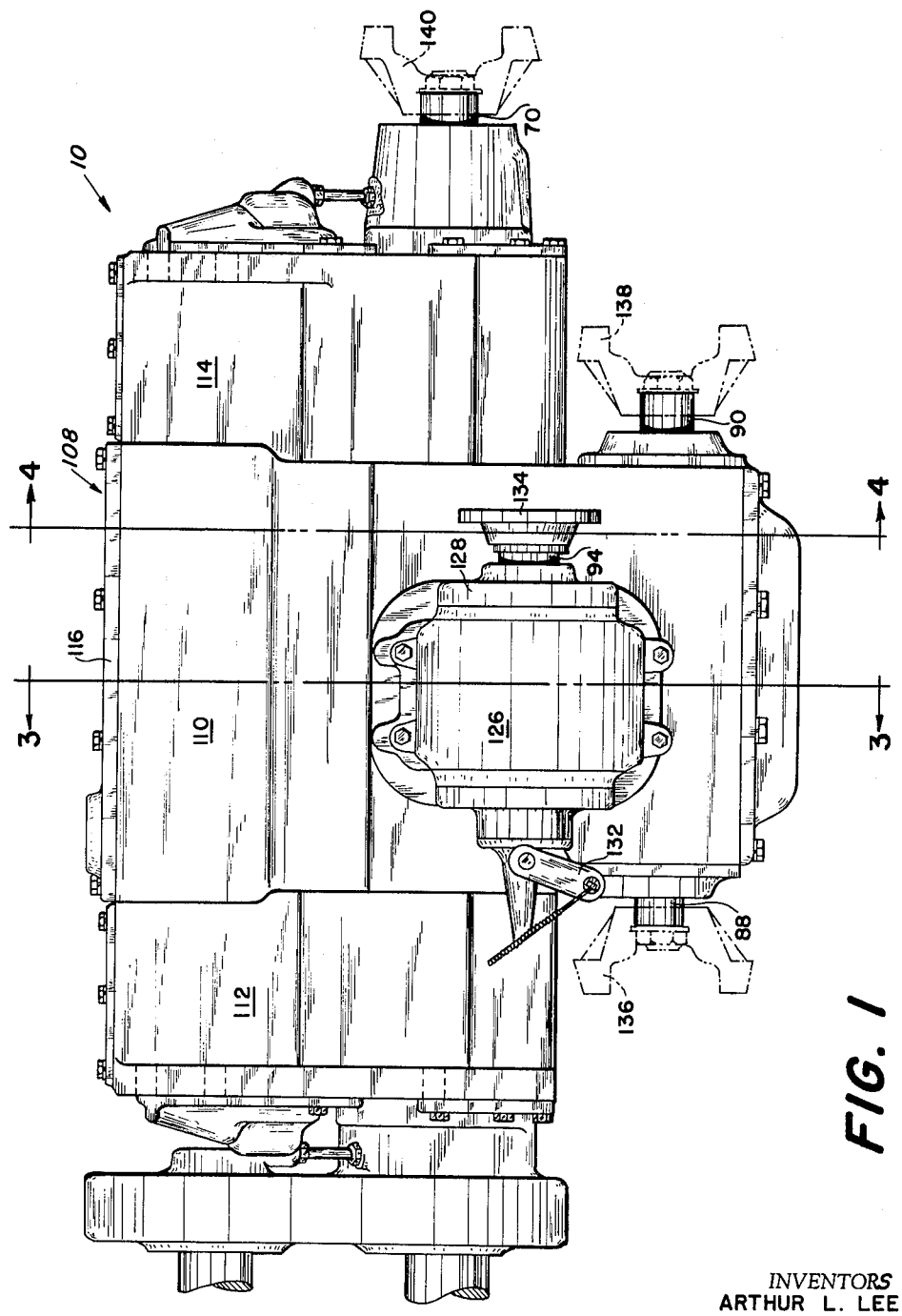
FIGURE 1 is a view of our improved transmission in side elevation illustrating the auxiliary power take-off device and the plurality of output shafts.

In describing the preferred embodiment of this invention, illustrated in the drawings, specific terminology will be resorted to for the sake of clarity. We do not, however, intend to be limited to the specific terms so selected and it should be understood that each specific term includes all technical equivalents which operate in a similar manner to accomplish a similar purpose.

Figure 5:
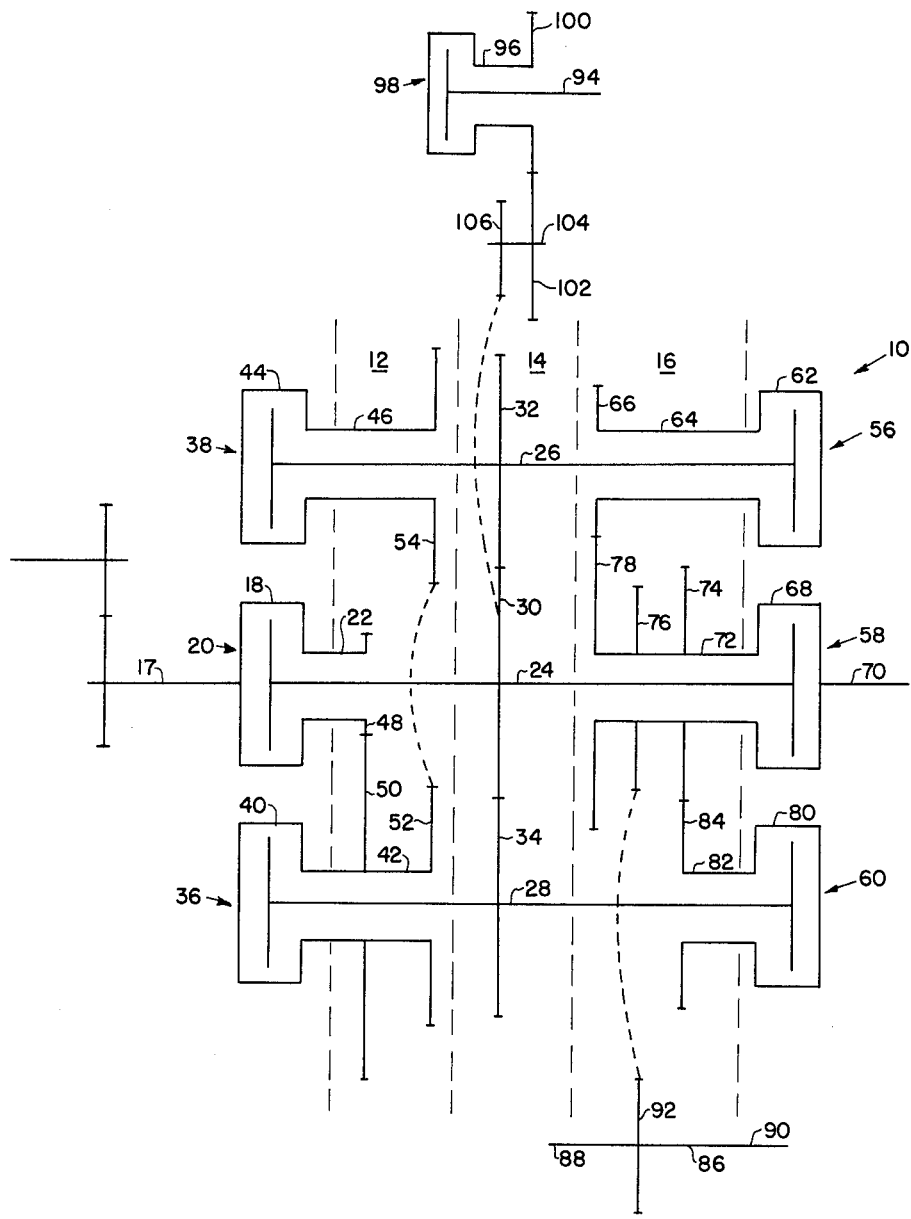
FIGURE 5 is a schematic illustration of our improved transmission.

Referring firstly to FIGURE 5 wherein the schematic arrangement of our transmission is set forth, a brief description of the transmission and its manner of control will be made to provide a background for the improvements illustrated herein. It should be understood although only six speed species of our transmission is illustrated in FIGURE 5, that the improvements disclosed herein may, with equal facility, be utilized on the other species disclosed in our copending application.

The transmission schematically disclosed in FIGURE 5 has six speeds in the forward direction and three speeds in the reverse direction. The transmission 10 has a range section 12, a connecting section 14 and a speed ratio section 16. Each of the sections 12, 14 and 16 enclose the gears which are included in the range section, connecting section and speed ratio section.

A prime mover, not shown, drives an input shaft 17 which is connected to the exterior housing 18 of a clutch 20. The input shaft 17 may connect the transmission 10 to the prime mover, or a two or three gear input arrangement between the prime mover and the input shaft 17 may be employed to control the clockwise or counterclockwise rotation of the output shaft. For example, a two gear arrangement is schematically illustrated in FIGURE 5.

The external housing 18 of clutch 20 is nonrotatably secured to a tubular shaft 22. The tubular shaft 22 is coaxially positioned on a countershaft 24 and is freely rotatable thereon.

Within the transmission 10 there are three countershafts 24, 26 and 28 which are arranged in parallel spaced relation to each other. Each of the countershafts has a connecting gear, namely 30, 32 and 34, secured thereto and rotatable therewith. The connecting gears are arranged in substantially the same vertical plane within the connecting section and, as indicated in FIGURE 5, are in meshing relation with each other so that rotation of any of the countershafts 24, 26 or 28 provides rotation for the remaining countershafts through the respective connecting gears.

In the range section 12 there are two forward range clutches, high range clutch 20 and low range clutch 36, and a reverse clutch 38. The exterior housing 40 of low range clutch 36 is connected to a tubular shaft 42 arranged coaxially on countershaft 28 in rotatable relation thereto. The external housing 44 of reverse clutch 38 is connected to the tubular shaft 46 positioned on countershaft 26 in rotatable relation thereto. Tubular shaft 22 has a spur gear 48 secured thereto and tubular shaft 42 has a spur gear 50 secured thereto and in meshing relation with spur gear 48. Thus, as input shaft 17 rotates clutch exterior housing 18, spur gear 48 drives spur gear 50 on tubular shaft 42. The tubular shaft 42 has another spur gear 52 secured thereto. The tubular shaft 46 has a spur gear 54 secured thereto and in meshing relation with spur gear 52 on tubular shaft 42. With this arrangement of the range section, engagement of clutch 20, clutch 36, or clutch 38 transmits drive from input shaft 17 to countershaft 24, 26 and 28 at a plurality of speeds in one direction or at a single speed in another direction. It is apparent if clutch 20 is engaged, shafts 24, 26 and 28 are driven at substantially the same speed as input shaft 17 since clutch 20 provides a direct connection between input shaft 17 and countershafts 24, 26 and 28. If, on the other hand, low range clutch 36 is engaged, drive from input shaft 17 is provided for countershafts 24, 26 and 28 at a reduced speed because of the ratio of gears 48 and 50.

The speed ratio section 16 includes three speed ratio clutches 56, 58 and 60. Clutch 56 is a low speed ratio clutch, clutch 58 is an intermediate ratio clutch, and clutch 60 is a high ratio clutch. The exterior housing 62 of clutch 56 is nonrotatably secured to a tubular shaft 64 coaxially positioned on countershaft 26 in rotatable relation thereto. A spur gear 66 is secured to and rotatable with tubular shaft 64. The external housing 68 of clutch 58 has an output shaft 70 secured thereto and rotatable therewith. The external housing 68 is connected to a tubular shaft 72 coaxially arranged on countershaft 24. The tubular shaft 72 has a first spur gear 74 secured thereto and rotatable therewith. The tubular shaft 72 also has another spur gear 76 secured thereto and rotatable therewith and another spur gear 78 secured thereto and rotatable therewith. The external housing 80 of clutch 60 is secured to a tubular shaft 82 which has a spur gear 84 secured thereto. The gear 84 meshes with spur gear 74 secured to tubular shaft 72. The spur gear 78 meshes with spur gear 66 to transmit drive from countershaft 26 through tubular shaft 64, spur gears 66 and 78 to tubular shaft 72. With this arrangement three speeds in low range and three speeds in high range are available with the transmission 10.

Figure 4:
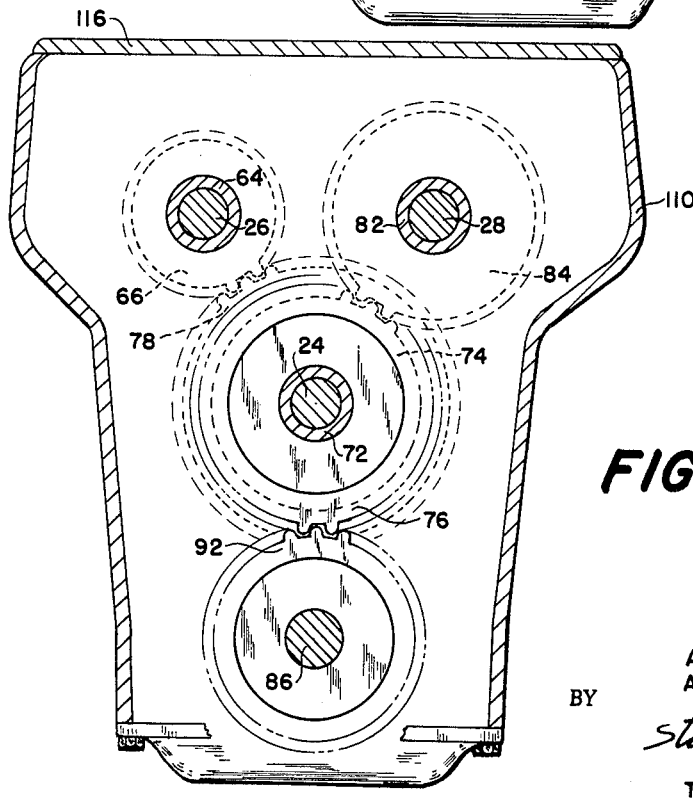
FIGURE 4 is a view in section taken along the lines 4—4 of FIGURE 1 illustrating the gearing arrangement connecting an output shaft to the other gearing in the transmission.

There is also schematically illustrated in FIGURE 5 another output shaft 86 which has a front end portion 88 and a rear end portion 90. Secured to and rotatable with shaft 86 intermediate the end portions 88 and 90 is a spur gear 92 that meshes with gear 76 secured to tubular shaft 72. The output shaft 86 is capable of providing the same number of speeds in the same direction as output shaft 70. FIGURE 4, which is a section taken along the lines 4—4 of FIGURE 1, illustrates the relative position of output shaft 86 and countershaft 24 with tubular shaft 72 coaxially positioned thereon. Gears 66, 78, 74 and 84 are illustrated in dotted lines in FIGURE 4 and gears 76 and 92 are illustrated in full lines.

Illustrated schematically in FIGURE 5, an auxiliary power take-off shaft 94 has a tubular shaft 96 positioned thereon in rotatable relation thereto. A clutch 98 is arranged to frictionally engage tubular shaft 96 to auxiliary power take-off shaft 94. A spur gear 100 is secured to tubular shaft 96 and meshes with a spur gear 102 secured to idler shaft 104. The idler shaft 104 has another spur gear 106 secured thereto which meshes with connecting gear 30 to provide a gear train from the connecting gear 30 to the auxiliary power take-off shaft 94. The relative position of the power take-off shaft 94, idler shaft 104 and the gears 100, 102, 106 and 30 are clearly illustrated in FIGURE 3 which is a section taken through the connecting section 14 of transmission 10.

Figure 2:
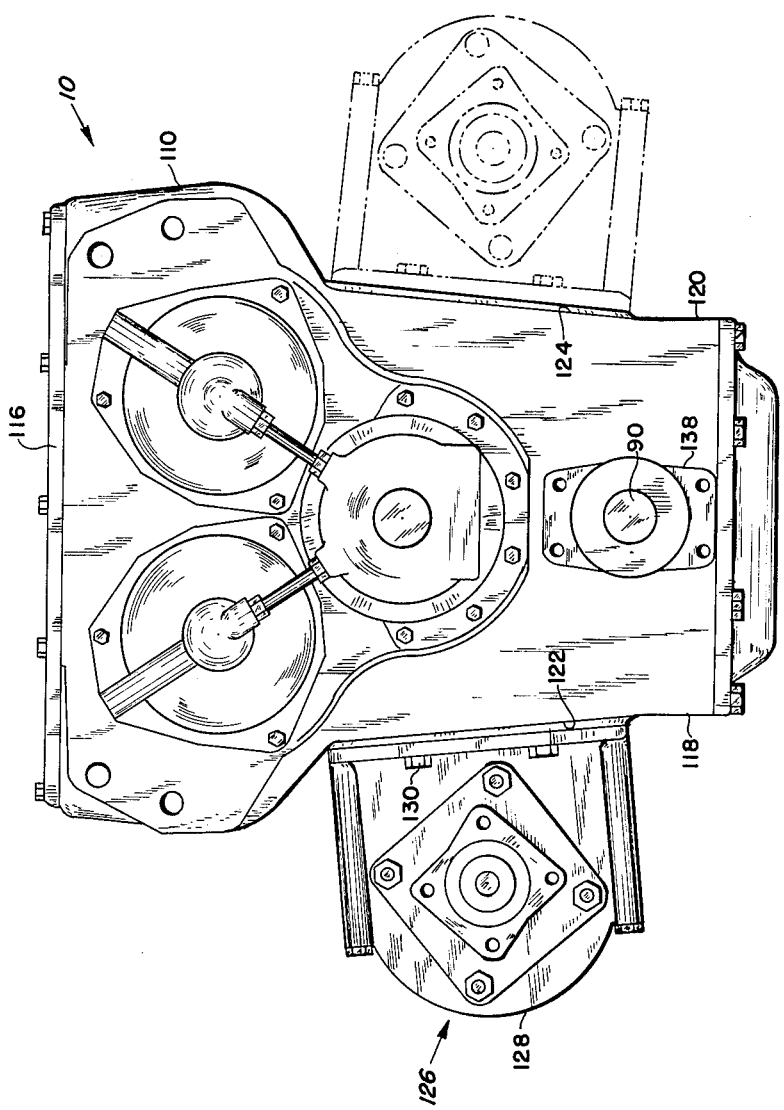
FIGURE 2 is a view in end elevation of our improved transmission illustrating in dotted lines how the auxiliary power take-off device may be connected to either side of the transmission housing.
Figure 3:
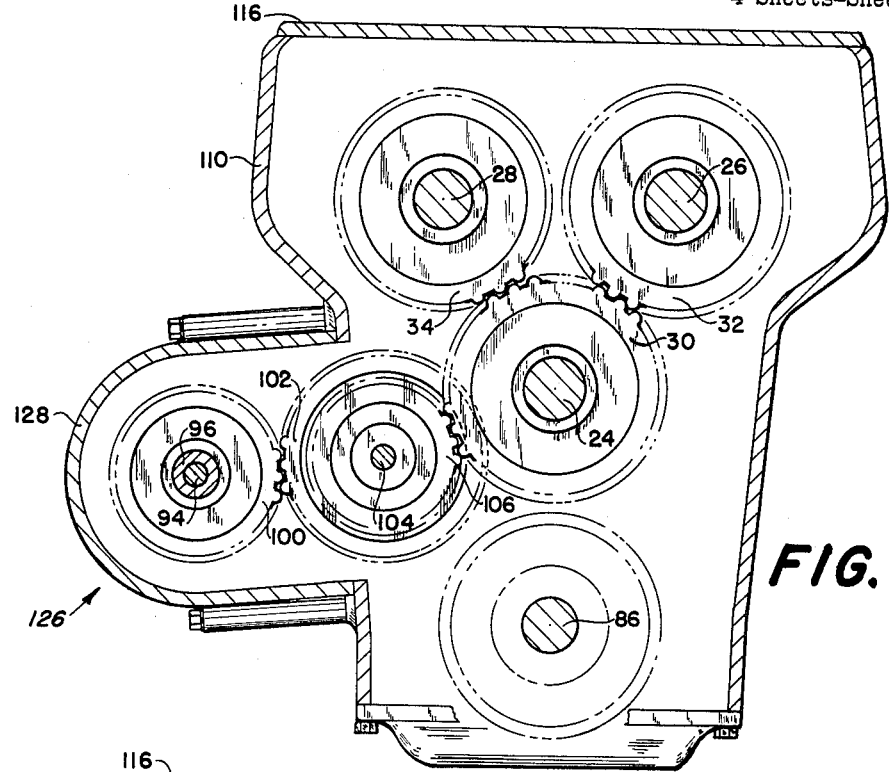
FIGURE 3 is a view in section taken along the lines 3—3 of FIGURE 1 illustrating the manner in which the power take-off device is driven by one of the connecting gears.

Referring to FIGURES 1 and 2 the transmission 10 is illustrated with a housing 108 enclosing the various shafts and gears described with the schematic illustration in FIGURE 5. The housing 108 has a main body section 110 which includes the range section 12, connecting section 14 and speed ratio section 16. Auxiliary casings 112 and 114 enclose the clutches positioned on the forward and rear end portions of the transmission 10. The main transmission housing 110 has a top cover 116 and a pair of vertical side walls 118 and 120. The side walls 118 and 120 have openings 122 and 124 therein. The openings 122 and 124 are aligned with the connecting section 14 of the transmission. An auxiliary power take-off device generally designated by the numeral 126 has a housing 128 which supports the auxiliary power take-off shaft 94. The power take-off housing 128 is positioned on either vertical side wall 118 or 120 of transmission housing 110 over the opening 122 or 124 and is secured thereto by means of bolts 130. With this arrangement, the auxiliary power take-off device 126 may be positioned on either side of the transmission housing 110. The idler shaft 104 is rotatably secured within the transmission housing 110 and may be positioned on either side of connecting gear 30 depending on what side wall the auxiliary power take-off housing 128 is secured. As illustrated in FIGURES 1, 2 and 3, the housing 128 is secured to the left side 118 of transmission housing 110. The housing 128 includes an actuator 132 (see FIGURE 1) which is adapted to engage clutch 98 to provide a drive between tubular shaft 96 and auxiliary power take-off shaft 94. Secured to the end of auxiliary power take-off shaft 94 is a bell housing 134 through which power take-off shaft 94 is connected to an auxiliary device, not shown.

The output shaft 86 is positioned below counter shaft 24 and has its end portions 88 and 90 extend beyond the transmission housing 110. Couplers 136 and 138 are shown secured to the output shaft end portions 88 and 90. If desired, cap members may be positioned over one of the end portions of shaft 86 when the particular end portion is not connected to a propelling means. In a similar manner, coupler 140 is connected to output shaft 70.

*Operation*

The power take-off device generally designated by the numeral 126 operates as follows. The power take-off shaft 94 is adapted to be driven by tubular shaft 96 through frictional clutch 98. A gear train comprising gears 100, 102 and 106 provide a geared connection between connecting gear 30 and auxiliary power take-off shaft 94. With this arrangement when any of the countershafts are actuated by means of input shaft 16 being connected to the countershafts through the various clutches 20, 36 and 38, the gear train 106, 102 and 100 is energized and rotates with the connecting gear 30. When it is desired to actuate the power take-off shaft 94, the clutch 98 through actuator 132 frictionally engages tubular shaft 96 to auxiliary power take-off shaft 94. In this manner the shaft 94 is driven by connecting gear 30. Thus to actuate power take-off shaft 94, clutch 98 must be engaged and one of clutches 20, 36 or 38 must be engaged. To change speed of rotation of auxiliary power take-off shaft 94 disengaging clutch 36 and engaging clutch 20 increases speed of auxiliary power take-off shaft 94. In a similar manner, if it is desired to reduce the speed of power take-off shaft 94, clutch 20 is disengaged and clutch 36 is engaged. These clutches, that is, clutch 20 and clutch 36, are the range clutches for the transmission. With this arrangement the speed of the power take-off device 126 is controlled by the clutches of the transmission proper. The power take-off device 126 may be operated while the transmission is propelling the vehicle or it may be operated when the vehicle is inactive. If it is desired to operate the auxiliary power take-off device 126 when the vehicle is not moving, speed ratio clutches 56, 58 and 60 are disengaged. This hydraulically isolates the transmission 10 from the vehicle since rotation of shafts 24, 26 and 28 is not transmitted to either output shaft 70 or output shaft 86. If it is desired to operate the power take-off device 126 in a reverse direction, reverse clutch 38 is engaged. This transmits rotation from input shaft 17 to auxiliary power take-off shaft 94 in a reverse direction.

It will thus be seen that our improved transmission now includes a power take-off device 126 that has its speeds controlled by the range clutches of the transmission. Our improved transmission also has another output shaft 86 which is arranged in substantially parallel relation with the countershafts 24, 26 and 28 and provides output connections either forwardly or rearwardly of the transmission. Thus with a minimum number of gears, shafts and clutches, we have provided a transmission having a plurality of power output shafts and an auxiliary power take-off device that has a plurality of speeds.

According to the provisions of the patent statutes, we have explained the principle, preferred construction, and mode of operation of our invention and have illustrated and described what we now consider to represent its best embodiment. However, we desire to have it understood that, within the scope of the appended claims, the invention may be practiced otherwise than as specifically illustrated and described.

We claim:
1. A constant mesh transmission having a housing, a plurality of shafts journaled for rotation in parallel spaced relation within said housing, a pair of said shafts arranged in substantially the same plane, a third of said shafts spaced from the plane formed by said first pair of shafts, a connecting gear nonrotatably secured to each of said shafts, said connecting gears on said pair of shafts meshing with said connecting gear on said third shaft so that all of said shafts rotate upon the rotation of any one shaft, a transmission input shaft, first drive means including directional clutch means to selectively and operatively connect said input shaft to said shafts to provide said shafts with a plurality of speeds in one direction, the improvement comprising an auxiliary power take-off shaft rotatably supported in parallel spaced relation with said third shaft and spaced from the plane formed by said first pair of shafts, gearing connecting said auxiliary power take-off shaft to said connecting gear secured to said third shaft so that said power take-off shaft is operable to be selectively driven at one of a plurality of speeds by said connecting gear on said shaft.

2. In a constant mesh transmission having a housing, a plurality of shafts journaled for rotation in parallel spaced relation within said housing, a pair of said shafts arranged in substantially the same horizontal plane, a third of said shafts positioned below said pair of shafts, a constantly meshing gear train associated with said shafts for drivingly connecting said shafts so that said shafts rotate upon the rotation of any one of said shafts, a first ouptut shaft axially aligned with said third shaft, drive means including gearing and clutch means to selectively and operatively connect said shafts to said output shaft said drive means further including a tubular shaft rotatably positioned on said third shaft and drivingly connected to said first output shaft, a gear coaxially secured to and rotatable with said tubular shaft, a second output shaft arranged in said housing in parallel spaced relation to said other shafts below said third shaft, and a gear coaxially secured to and rotatable with said second output shaft, said last named gear in meshing relation with said gear on said tubular shaft to drivingly connect said second output shaft to said tubular shaft.

3. A constant mesh transmission having a housing, a plurality of shafts journaled for rotation in parallel spaced relation within said housing, a pair of said shafts arranged in substantially the same horizontal plane, a third of said shaft positioned below said pair of shafts, a connecting gear nonrotatably secured to each of said shafts, said connecting gears on said pair of shafts meshing with said connecting gear on said third shaft so that all of said shafts rotate upon the rotation of any one shaft, a transmission input shaft, first drive means including directional clutch means to selectively and operatively connect said input shaft to said shafts to provide said shafts with a plurality of speeds in one direction, the improvement comprising an auxiliary power take-off shaft rotatably supported in parallel spaced relation with said third shaft below said pair of shafts, gearing connecting said auxiliary power take-off shaft to said connecting gear secured to said third shaft so that said power take-off shaft is operable to be selectively driven at one of a plurality of speeds by said connecting gear on said shaft.

4. A constant mesh transmission as set forth in claim 1 which includes an output shaft journaled in said housing in parallel relation to and below said third shaft, a tubular shaft coaxially positioned on said third shaft in rotatable relation thereto, gearing and clutch means arranged to selectively connect said shafts to said tubular shaft, and constantly meshing gearing connecting said output shaft to said tubular shaft.

References Cited by the Examiner
UNITED STATES PATENTS

| | | | |
|---|---|---|---|
| 2,162,979 | 6/1939 | Simpson | 74—15.4 X |
| 2,784,710 | 3/1957 | Kremser | 74—15.2 X |
| 3,023,640 | 3/1962 | Schou | 74—15.88 X |
| 3,064,488 | 11/1962 | Lee et al. | 74—360 |
| 3,080,767 | 3/1963 | Price | 74—360 |
| 3,130,595 | 4/1964 | Cook | 74—360 X |

FOREIGN PATENTS

| | | |
|---|---|---|
| 491,975 | 3/1954 | Italy. |

BROUGHTON G. DURHAM, *Primary Examiner.*